United States Patent
Kim et al.

(10) Patent No.: US 11,069,126 B2
(45) Date of Patent: Jul. 20, 2021

(54) SYSTEM AND METHOD FOR PROVIDING VIRTUAL EXHIBITION SPACE UTILIZING 2.5 DIMENSIONAL IMAGE

(71) Applicant: DIFT CORPORATION, Seoul (KR)

(72) Inventors: Dong Ree Kim, Hwaseong-si (KR); Chi Hyung Park, Seoul (KR); In Je Cho, Seoul (KR)

(73) Assignee: DIFT CORPORATION, Seoul (KR)

( * ) Notice: Subject to any disclaimer, the term of this patent is extended or adjusted under 35 U.S.C. 154(b) by 123 days.

(21) Appl. No.: 16/685,556

(22) Filed: Nov. 15, 2019

(65) Prior Publication Data

US 2020/0082604 A1 Mar. 12, 2020

Related U.S. Application Data

(63) Continuation of application No. PCT/KR2017/005086, filed on May 17, 2017.

(30) Foreign Application Priority Data

May 17, 2017 (KR) .................. 10-2017-0060766

(51) Int. Cl.
*G06T 15/20* (2011.01)
*G06T 3/40* (2006.01)
(Continued)

(52) U.S. Cl.
CPC .............. *G06T 15/20* (2013.01); *G06T 3/40* (2013.01); *G06T 3/60* (2013.01); *G06T 15/60* (2013.01)

(58) Field of Classification Search
CPC .............. G06F 2111/18; G06F 3/0481; G06F 3/04817; G06F 9/4443; G06F 3/04847;
(Continued)

(56) References Cited

U.S. PATENT DOCUMENTS

2005/0030309 A1 2/2005 Gettman et al.
2020/0082604 A1* 3/2020 Kim ..................... G06T 15/20
(Continued)

FOREIGN PATENT DOCUMENTS

JP 2009-230635 A 10/2009
JP 2016-048456 A 4/2016
(Continued)

OTHER PUBLICATIONS

International Search Report issued in PCT/KR2017/005086; dated Feb. 12, 2018.
(Continued)

*Primary Examiner* — Todd Buttram
(74) *Attorney, Agent, or Firm* — Studebaker & Brackett PC

(57) ABSTRACT

A system and a method for providing a virtual exhibition space by utilizing a 2.5 dimension image. The system forms a perspective view having a specific viewpoint and the specific number of vanishing points with respect to a specific virtual exhibition space having a plurality of wall surfaces, calculates virtual 3D coordinates for a specific position on the plurality of wall surfaces in the perspective view, based on the varnishing points of the perspective view, positions a specific 2D content image on at least one wall surface of the plurality of wall surfaces in the perspective view by rotating or resizing the specific 2D content image based on the virtual 3D coordinates, and completes a virtual exhibition space image by using the perspective view having the content image.

9 Claims, 9 Drawing Sheets

(51) Int. Cl.
*G06T 3/60* (2006.01)
*G06T 15/60* (2006.01)

(58) Field of Classification Search
CPC .............. G06F 11/3664; G06F 3/0304; G06F 3/011–015; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

2021/0090330 A1* 3/2021 Park .................. G06T 19/003
2021/0090352 A1* 3/2021 Park .................. G06Q 50/10

FOREIGN PATENT DOCUMENTS

| KR | 10-2014-0082610 A | 7/2014 |
| KR | 10-2015-0113246 A | 10/2015 |
| KR | 10-2016-0112898 A | 9/2016 |

OTHER PUBLICATIONS

Office Action issued in KR 10-2017-0060766; mailed by the Korean Intellectual Property Office dated Nov. 5, 2018.

* cited by examiner

SYSTEM AND METHOD FOR PROVIDING VIRTUAL EXHIBITION SPACE UTILIZING 2.5 DIMENSIONAL IMAGE

CROSS-REFERENCE TO RELATED APPLICATIONS

The present application is a continuation of International Patent Application No. PCT/KR2017/005086, filed May 17, 2017, which is based upon and claims the benefit of priority to Korean Patent Application No. 10-2017-0060766, filed on May 17, 2017. The disclosures of the above-listed applications are hereby incorporated by reference herein in their entirety.

BACKGROUND

Embodiments of the inventive concept described herein relate to a virtual exhibition space, and more particularly, to a system and a method for providing a virtual exhibition space by utilizing a 2.5 dimensional image.

Recently, as information communication technologies are developed, virtual gallery services have been increasingly provided. For example, one virtual gallery service is a two dimensional (2D) service in which exhibition content is placed on a 2D wall surface image. Another virtual gallery service is a service in which the graphic of a virtual gallery is formed using a 3D engine. Still another virtual gallery service is to form a virtual reality gallery space using a VR technology, and to allow a user to experience contents exhibited in the virtual reality gallery space using a VR device.

The conventional flat gallery service fails to provide a 3D gallery service, and the gallery service using the 3D engine or the VR technology has a larger size of data and a larger number of data, so time taken to load the data is more required, and content may be damaged. Even a user terminal to use the gallery service has required high performance

SUMMARY

Embodiments of the inventive concept provide a system and a method for providing a virtual exhibition space by utilizing a 2.5 dimensional image.

The objects of the inventive concept are not limited to the above, but other effects, which are not mentioned, will be apparently understood to those skilled in the art.

According to an exemplary aspect, a system for providing a virtual exhibition space by utilizing a 2.5 dimension image, includes a virtual exhibition space generator configured to generate a virtual exhibition space image, and a server to receive a request for the virtual exhibition space image from a user terminal and to provide the virtual exhibition space image to the user terminal. The virtual exhibition space generator forms a perspective view having a specific viewpoint and the specific number of vanishing points with respect to a specific virtual exhibition space having a plurality of wall surfaces, calculates virtual 3D coordinates for a specific position on the plurality of wall surfaces in the perspective view, based on the varnishing points of the perspective view, positions a specific 2D content image on at least one wall surface of the plurality of wall surfaces in the perspective view by rotating or resizing the specific 2D content image based on the virtual 3D coordinates, and completes a virtual exhibition space image by using the perspective view having the content image.

According to an exemplary embodiment, the communication device receives information on a viewpoint change of a user from the user terminal. The virtual exhibition space generator regenerates a virtual exhibition space image based on the information on the viewpoint change, and the regenerating of the virtual exhibition space image based on the information on the viewpoint change includes reforming a perspective view based on a viewpoint which is changed for the virtual exhibition space . . . .

According to an exemplary embodiment, the virtual exhibition space generator completes the virtual exhibition space image by further using a plurality of shadow layers having mutually different transparencies and the specific number of lighting layers, determines a range of a shadow value based on an intensity of light and a position of the light at the lighting layer, and determines the number of the shadow layers or a layout of the shadow layers, based on the range of the shadow value.

According to an exemplary embodiment, a method for providing a virtual exhibition space by utilizing a 2.5 dimension image, which is implemented by a computer, including receiving a request for the virtual exhibition space image from a user, and generating and providing the virtual exhibition space image to the user terminal. The generating and providing of the virtual exhibition space image to the user terminal includes: forming a perspective view having a specific viewpoint and the specific number of vanishing points with respect to a specific virtual exhibition space having a plurality of wall surfaces, calculating virtual 3D coordinates for a specific position on the plurality of wall surfaces in the perspective view, based on the varnishing points of the perspective view, positioning a specific 2D content image on at least one wall surface of the plurality of wall surfaces in the perspective view by rotating or resizing the specific 2D content image based on the virtual 3D coordinates, and completing a virtual exhibition space image by using the perspective view having the content image.

According to an exemplary embodiment, the method further includes loading a still shot of a virtual exhibition space image received from a server. The generating and providing of the virtual exhibition space image further includes receiving the content image from the server during the loading of the still shot of the virtual exhibition space image, and replacing the still shot of the virtual exhibition space image with the completed virtual exhibition space image and providing the completed virtual exhibition space image.

According to an exemplary embodiment, the method further includes obtaining information on a viewpoint change of the user, and regenerating the virtual exhibition space image based on the information on the viewpoint change. The regenerating of the virtual exhibition space image based on the information on the viewpoint change includes reforming a perspective view based on a viewpoint which is changed for the virtual exhibition space.

According to an exemplary embodiment, the generating of the virtual exhibition space image includes completing the virtual exhibition space image by further using a plurality of shadow layers having mutually different transparencies and the specific number of lighting layers, determining a range of a shadow value based on an intensity of light and a position of the light at the lighting layer, and determining the number of the shadow layers or a layout of the shadow layers, based on the range of the shadow value.

The detailed matters of the inventive concept are included in the detailed description and accompanying drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
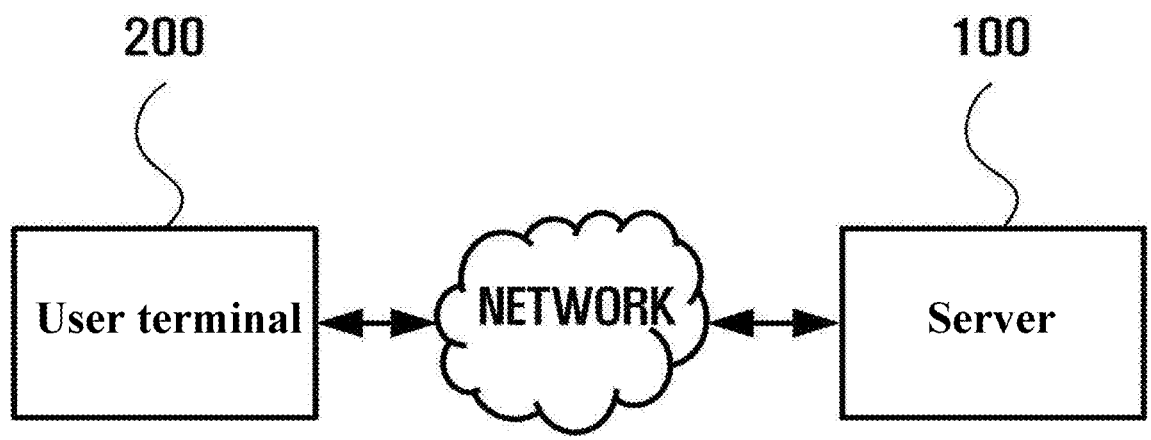
FIG. 1 is a block diagram schematically illustrating the structure of a system for providing virtual exhibition space utilizing a 2.5 D image, according to an embodiment of the inventive concept.

Advantage points and features of the inventive concept and a method of accomplishing the same will become apparent from the following description made with reference to accompanying drawings. The inventive concept, however, may be embodied in various different forms, and should not be construed as being limited only to the illustrated embodiments. Rather, these embodiments are provided as examples so that this disclosure will be thorough and complete, and will fully convey the inventive concept to those skilled in the art. The inventive concept may be defined by scope of the claims.

The terminology used in the inventive concept is provided for the illustrative purpose, but the inventive concept is not limited thereto. As used herein, the singular terms "a," "an" and "the" are intended to include the plural forms as well, unless the context clearly indicates otherwise. Furthermore, it will be further understood that the terms "comprises", "comprising," "includes" and/or "including", when used herein, specify the presence of stated components, but do not preclude the presence or addition of one or more other components. The same reference numerals will be assigned to the same component throughout the whole specification, and "and/or" refers to that components described include not only individual components, but at least one combination of the components. It will be understood that, although the terms "first", "second", etc., may be used herein to describe various components, these components should not be limited by these terms. These terms are only used to distinguish one component from another component. Thus, a first component to be described below may be a second component without departing from the teachings of the inventive concept.

Unless otherwise defined, all terms (including technical and scientific terms) used herein have the same meaning as commonly understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms, such as "below", "beneath", "lower", "above", "upper", and the like, may be used herein for ease of description to describe one component or feature's relationship to another component(s) as illustrated in the figures. It will be understood that the spatially relative terms are intended to encompass different orientations of the component in use or operation in addition to the orientation depicted in the figures. For example, when a component illustrated in accompanying drawings is reversed, a component provided 'below' or 'beneath' another component may be placed 'above' another component. Accordingly, the term "below" may include both concepts of "below" and "above. A component may be oriented in a different direction. Accordingly, terminology having relatively spatial concepts may be variously interpreted depending on orientations.

Hereinafter, embodiments of the inventive concept will be described with reference to accompanying drawings.

In this specification, a "content image" includes any content that may be expressed as a photograph or a picture as a creation by an artist, or a portrait or landscape photograph taken by an individual, and other images.

FIG. 1 is a block diagram schematically illustrating the configuration of a system for providing a virtual exhibition space by utilizing a 2.5 D image, according to an embodiment of the inventive concept.

Referring to FIG. 1, according to an embodiment of the inventive concept, a system for providing a virtual exhibition space by utilizing a 2.5D image includes a server 100 and a user terminal 200.

The server 100 and the user terminal 200 are connected with each other through a network. The server 100 and the user terminal 200 may transmit and receive various data and/or information. The network may include a wired or wireless network. The size, the topology, or the communication scheme of the network may be provided in various modifications according to embodiments.

The server 100 provides a virtual exhibition space image to the user terminal 200, in response to a request for the virtual exhibition space image from the user terminal 200. The virtual exhibition space image is provided in the form of a 2.5D image. In this specification, the 2.5D image represents a 2D image representing a cubic effect based on the cognitive illusion. The cognitive illusion is an illusion that is made in the cognitive process according to unconscious inference, and made because the human cognition trends to synthetically judge a whole thing. The details thereto may make the subject matter of the inventive concept unclear and thus will be omitted below.

Figure 2:
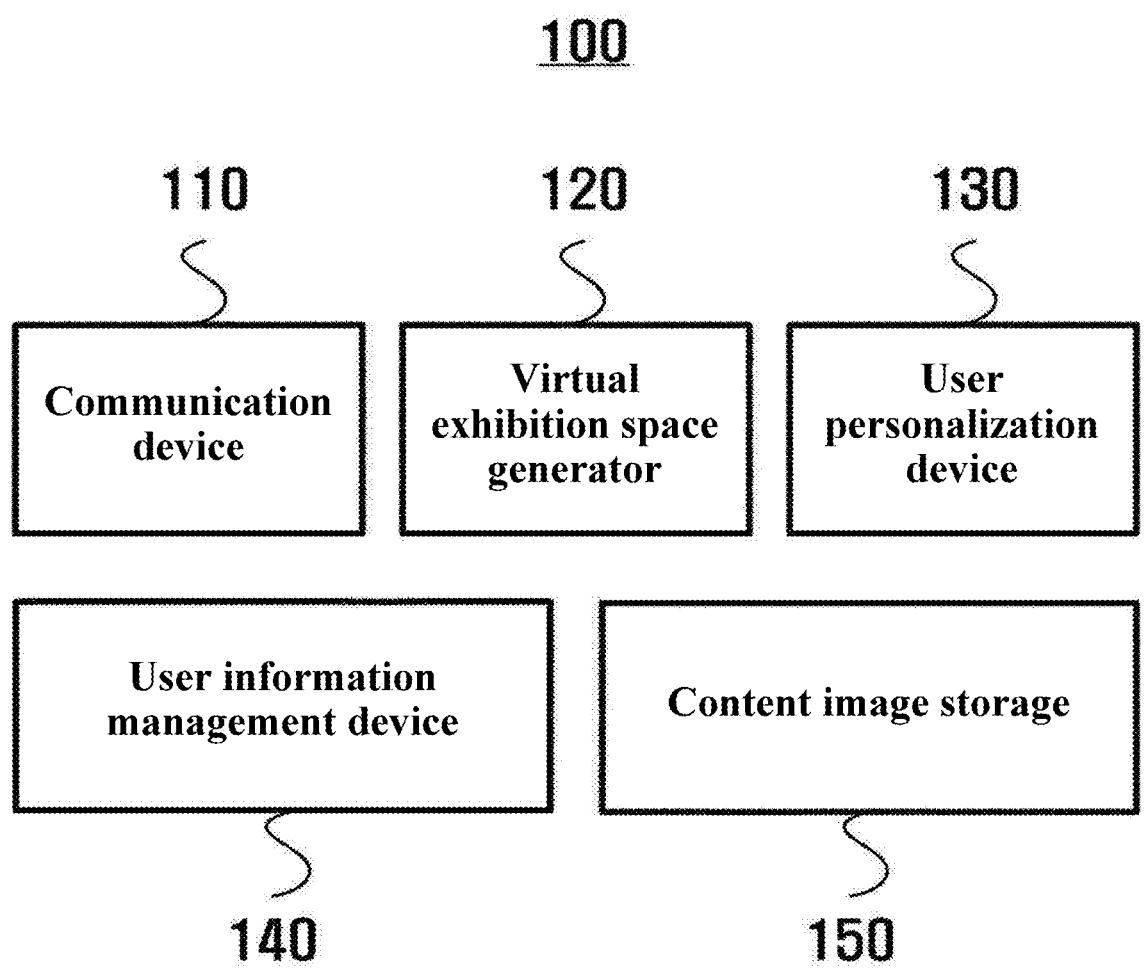
FIG. 2 is a block diagram schematically illustrating the detailed components of the server of FIG. 1.

FIG. 2 is a block diagram schematically illustrating the detailed configuration of the server of FIG. 1.

Referring to FIG. 2, the server 100 includes a communication device 110, a virtual exhibition space generator 120, a user personalization device 130, a user information management device 140, and a content image storage 150. The communication device 110, the virtual exhibition space generator 120, the user personalization device 130, the user information management device 140, and the content image storage 150 may transmit and receive various data and/or information.

The communication device 110 communicates with the user terminal 200. According to some embodiments, the communication device 110 receives the request for the virtual exhibition space image from the user terminal 200, and provides the virtual exhibition space image to the user terminal 200. In addition, according to some embodiments, the communication device 110 provides a content image to the user terminal 200. In addition, according to some embodiments, the communication device 110 receives information on a viewpoint change of a user from the user terminal 200 and provides the virtual exhibition space image to the user terminal 200.

The virtual exhibition space generator 120 generates the virtual exhibition space image. The virtual exhibition space generator 120 forms a perspective view having a specific viewpoint and the specific number of vanishing points with respect to a specific virtual exhibition space. The virtual exhibition space may include a plurality of wall surfaces. The structure of the virtual exhibition space may be previously designed and provided. The virtual exhibition space generator 120 may previously store data on the structure of the virtual exhibition space. The virtual exhibition space generator 120 calculates virtual 3D coordinates for a specific position on the plurality of wall surfaces in the perspective view, based on the varnishing points of the perspective view. For example, the 3D coordinates may be calculated with respect to an edge of each wall surface, but the inventive concept is not limited thereto. The virtual exhibition space generator 120 may position a specific content image in the 2D on at least one of the plurality of wall surfaces in the perspective view, by rotating or resizing a specific 2D content image in the 2D based on the virtual 3D coordinates. The virtual exhibition space generator 120 completes a virtual exhibition space image by using the perspective view having the content image.

The user personalization device 130 analyzes the type or the category of content preferred by each user. To this end, the user personalization device 130 may use a viewing history or feedback history of a user. The user personalization device 130 may recommend content or an exhibition space preferred by the user using an analysis result of preference information of the user. The recommended content may be reflected in the virtual exhibition space image in real time. Through personalization of the user, the visit rate and purchase rate of the user may be increased.

The user information management device 140 manages user information. For example, the user information may include profile information such as a user account, a password, the name, a gender, an age, an area, or an occupation, and the preference information of the user.

The content image storage 150 stores the content image. Alternatively, the content image storage 150 may be provided in the separate form of a server, which is different from FIG. 2.

Meanwhile, according to an embodiment, the server 100 may further include components not illustrated in FIG. 2 or may be modified not to include some components illustrated in FIG. 2.

The user terminal 200 refers to a computer system used by the user. For example, the user terminal 200 may be provided in the form of a mobile computer system such as a smart phone, a tablet, or a personal digital assistant (PDA). Alternatively, the user terminal 200 may be provided in the form of a stationary computer system such as a laptop or desktop computer system. The user terminal 200 is not limited to above-described embodiment, but may be provided in the form of a computer system through a network.

In an embodiment, the user terminal 200 receives the virtual exhibition space image from the server 100 and provides the virtual exhibition space image to the user.

Alternatively, in an embodiment, the user terminal 200 receives data and a content image about the structure of the virtual exhibition space from the server 100 and directly generates the virtual exhibition space image. The user terminal 200 may previously store data on the structure of the virtual exhibition space. The manner in which the user terminal 200 generates the virtual exhibition space image is substantially the same as the manner described above.

Figure 3:
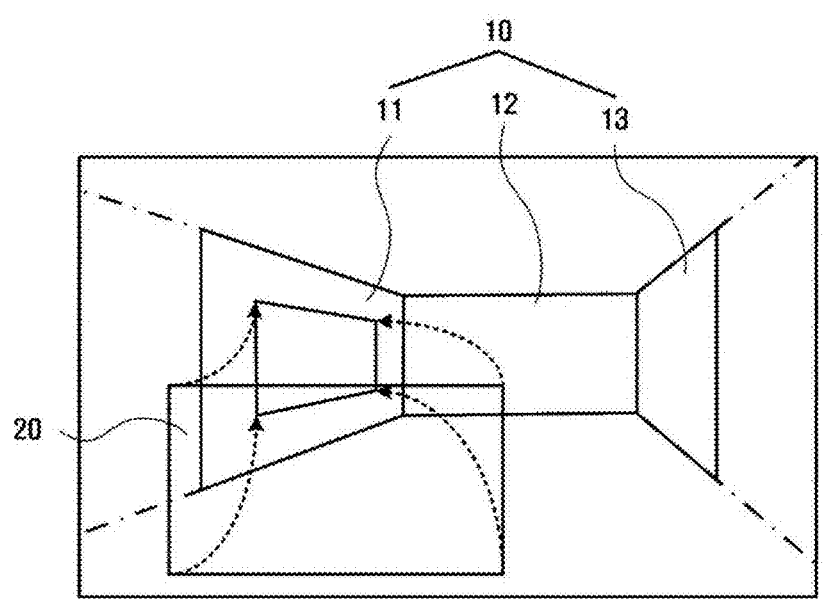
FIG. 3 is a view schematically illustrating the perspective view as a 2.5D image using cognitive illusion.

FIG. 3 is a view schematically illustrating the perspective view as a 2.5D image using cognitive illusion.

FIG. 3 schematically illustrates the cubic effect in a 2.5D that a user may feel through the perspective view having one varnishing point, As described above, the virtual exhibition space expressed in the form of a perspective view is configured to include a plurality of wall surfaces 11, 12, and 13. Then, the specific content image 20 is rotated or resized to be positioned on the wall surfaces 11, 12, and 13. Alternatively, the whole shape of the content image 20 may be modified to express the cubic effect. Although one content image 20 is disposed on one wall surface 11 in FIG. 3, the inventive concept is not limited that. Each content image may be disposed on each of the wall surfaces 11, 12, and 13. In addition, a plurality of content images may be placed while being spaced apart from each other by a predetermined distance.

Figure 4A:
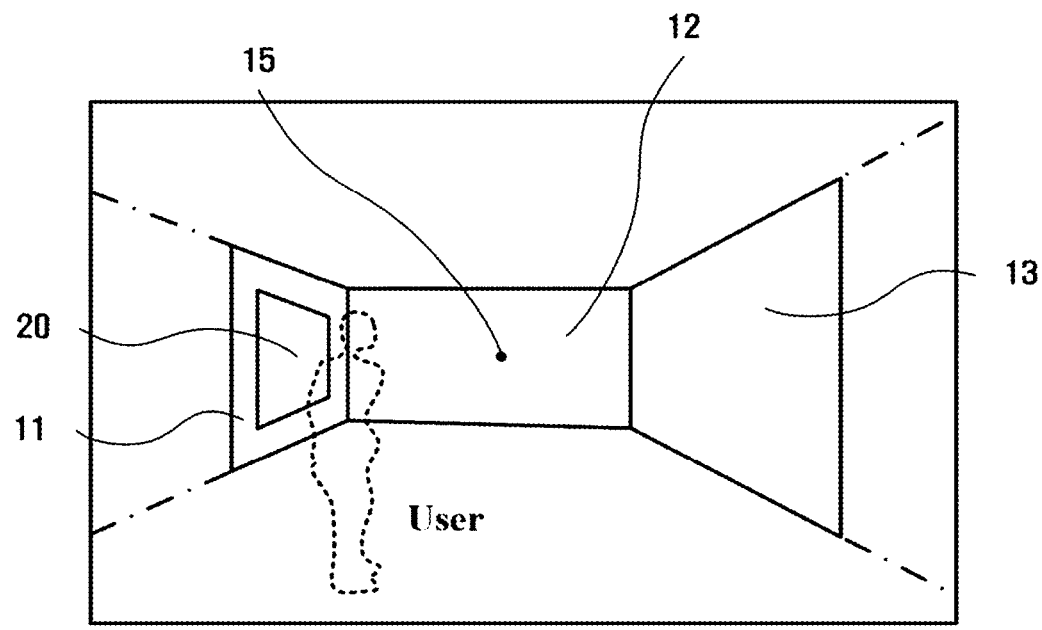
FIGS. 4A and 4B are views schematically illustrating the modification of the perspective view based on the viewpoint of the user.
Figure 4B:
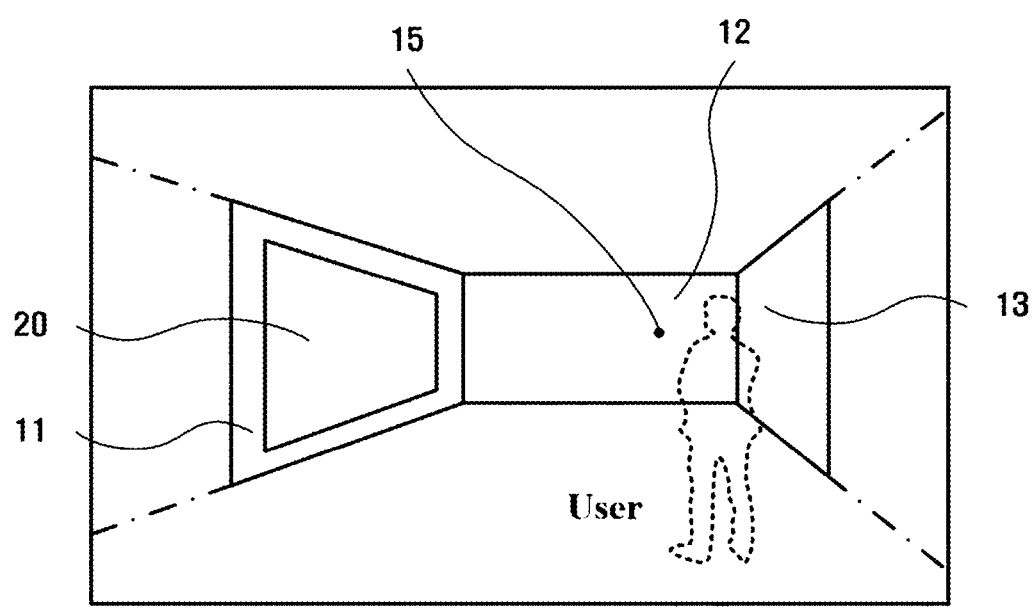

FIGS. 4A and 4B are views schematically illustrating the modification of the perspective view based on the viewpoint of the user.

Referring to FIGS. 4A and 4B, the appearance of the virtual exhibition space viewed by the user is changed based on the viewpoint of the user. Accordingly, even the viewpoint of the user and the position of the varnishing point 15 of the perspective view for the virtual exhibition space have to be changed.

To this end, the virtual exhibition space generator 120 regenerates the virtual exhibition space image, based on information on the viewpoint provided by the user terminal 200 In other words, the virtual exhibition space generator 120 may form a perspective view for the virtual exhibition space again, based on the changed viewpoint of the user. In this case, even the content image 20 is formed gain together.

For example, the user terminal 200 may estimate the change of the viewpoint of the user by using a gyroscope, and may generate information on the viewpoint change of the user, but the inventive concept is not limited thereto.

According to some embodiments, as described above, the server 100 may receive information on the viewpoint change of the user from the user terminal 200 to regenerate the virtual exhibition space image.

Alternatively, according to some embodiments, the user terminal 200 may obtain the information on the viewpoint change of the user and may regenerate the virtual exhibition space image based on the information on the viewpoint change.

Figure 5:
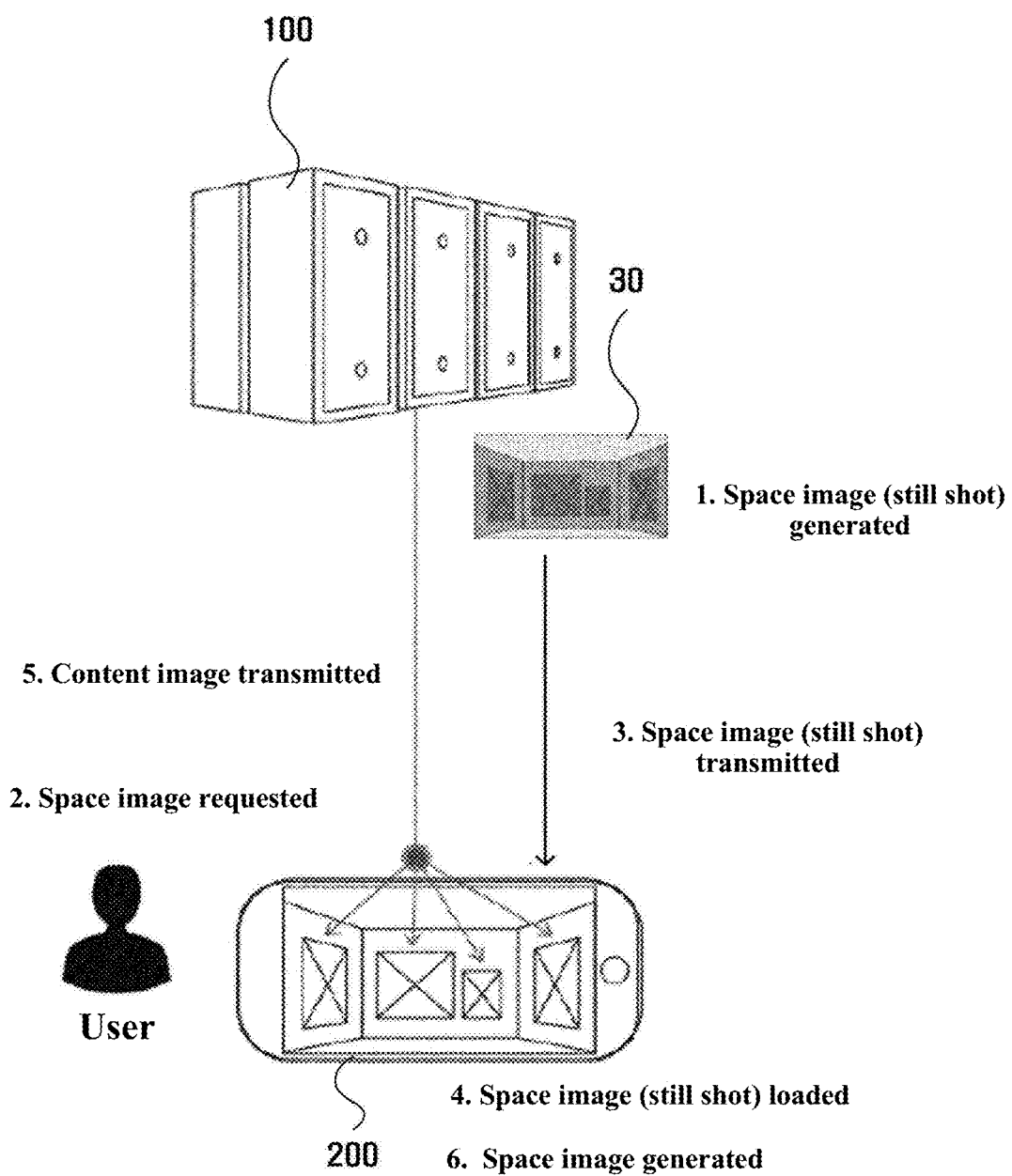
FIG. 5 is a view schematically illustrating a data transmission efficiency between the server and the user terminal.

FIG. 5 is a view schematically illustrating a data transmission efficiency between the server and the user terminal.

Referring to FIG. 5, in some embodiments, the server 100 generates a still shot (or snapshot) of a virtual exhibit space image. Alternatively, according to some embodiments, the server 100 stores a still shot of the virtual exhibition space image generated by another computer system. For example, the server 100 stores a still shot 30 of the virtual exhibition space image generated based on a (center) reference vanishing point position. When the request for the virtual exhibition space image is received from the user terminal 200, the server 100 provides, to the user terminal 200, the still shot 30 which previously generated. In addition, while the still shot 30 is loaded and displayed by the user terminal 200, the server 100 transmits an individual content image to the user terminal 200. The individual content image is to re-form a virtual exhibition space image as the detailed image is provided and the viewpoint change is made as described above. The user terminal 200 generates a virtual exhibition space image using the individual content image. When the virtual exhibition space image is completed, the user terminal 200 provides the still shot 30 by replacing the still shot 30 with the completed virtual exhibition space image. In this case, a fade in/out scheme may be utilized.

The user terminal 200 stores the still shot 30 and then does not request the still shot 30 to the server 100. Meanwhile, when the content image disposed in the virtual exhibition space is changed or updated, the server 100 may transmit, to the user terminal 200, the still shot 30 on which the change or the update of the content image is reflected.

The user terminal 200 may receive, from a user, a request for zooming in a wall surface on which a content image in the virtual exhibition space image is placed, and may provide a detailed image of the wall surface requested to be zoomed in by using the individual content image provided from the server 100 by enlarging the wall surface of the virtual exhibition space image. In the case of a request for zooming out the wall surface, the substantially same manner as that of the zooming-in manner is applied, and a reduced image of the wall surface requested to be zoomed out may be provided. A user interaction function is not limited to the above-described example.

Accordingly, since the still shot, which is previously generated, is first transmitted without transmitting an individual content image at the initial stage, loading may be rapidly performed and data may be effectively transmitted.

In addition, according to the above-described user personalization result, only a content image preferred by the user or the content image may be first transmitted to the user terminal 200 preferentially, thereby enabling fast loading and reducing data usage.

Figure 6:
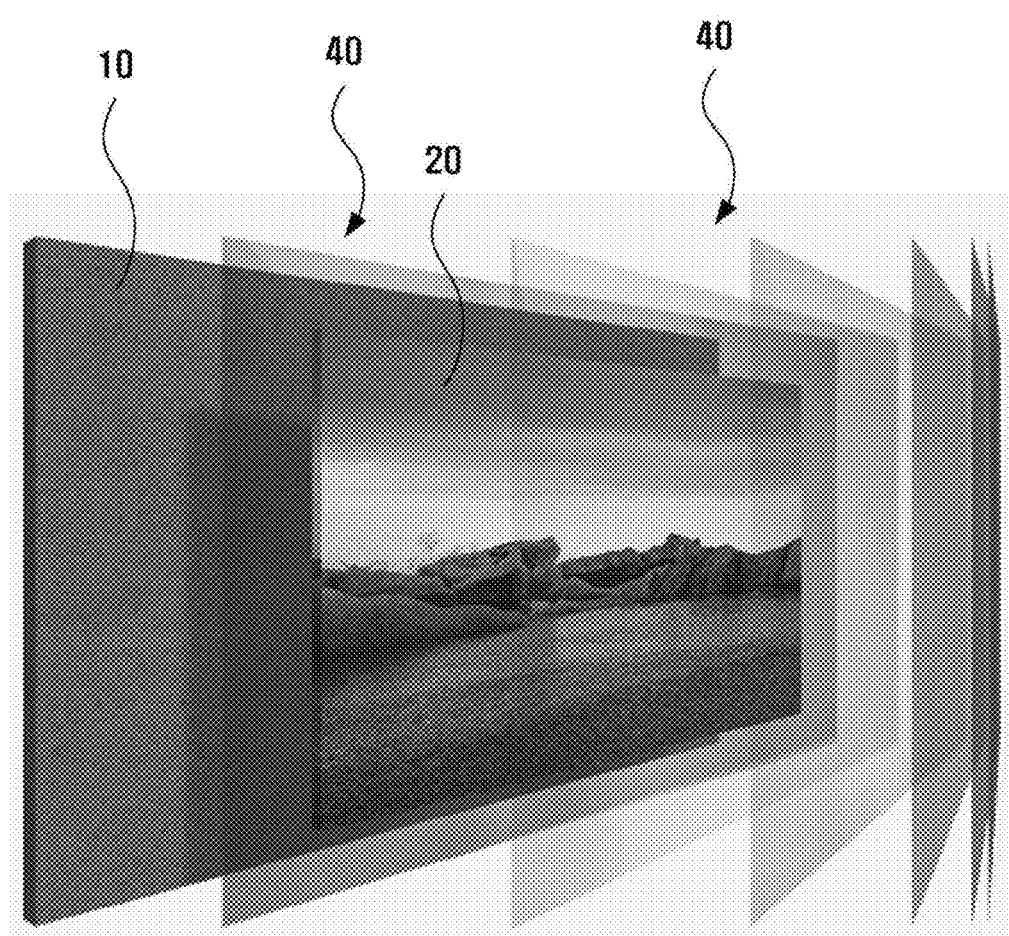
FIG. 6 is a view conceptually illustrating a digital drawing technique using a multilayer layer.

FIG. 6 is a view conceptually illustrating a digital drawing technique using a multilayer layer.

Referring to FIG. 6, the virtual exhibition space generator 120 completes the virtual exhibition space image by further using a plurality of shadow layers 40 having mutually different transparencies and the specific number of lighting layers, in addition to the wall surface 10 and the content image 20.

The shadow layer 40 may be interposed between the wall surface 10 and the content image 20, or may be interposed above the content image 20. In addition, multiple shadow layers 40 may be provided. In addition, the multiple shadow layers 40 may have mutually different shapes.

The virtual exhibition space generator 120 may determine a range of a shadow value based on an intensity of light and a position of the light at the lighting layer; and may determine the number of the shadow layers or a layout of the shadow layers, based on the range of the shadow value. The shadow layers 40 may be placed in the descending order or ascending order of transparency in the range of the shadow value. The shadow layer and the lighting layer may be rotated and resized and modified based on the virtual 3D coordinates of the perspective view. In addition, the whole shape may be modified.

Figure 7:
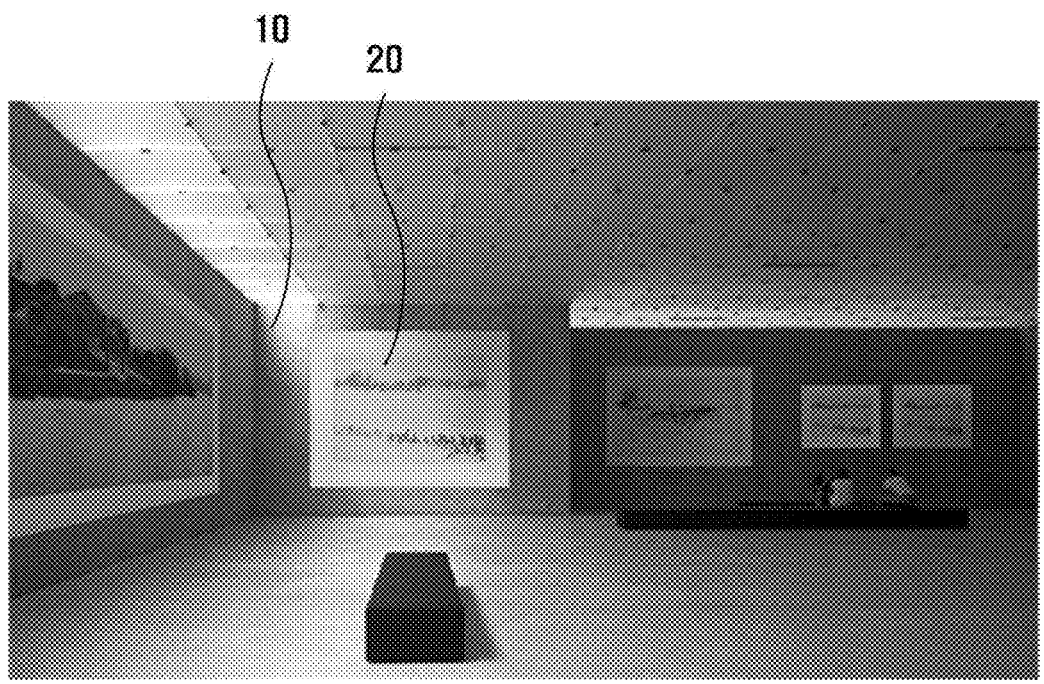
FIGS. 7 and 8 are views schematically illustrating a virtual exhibition space image.
Figure 8:
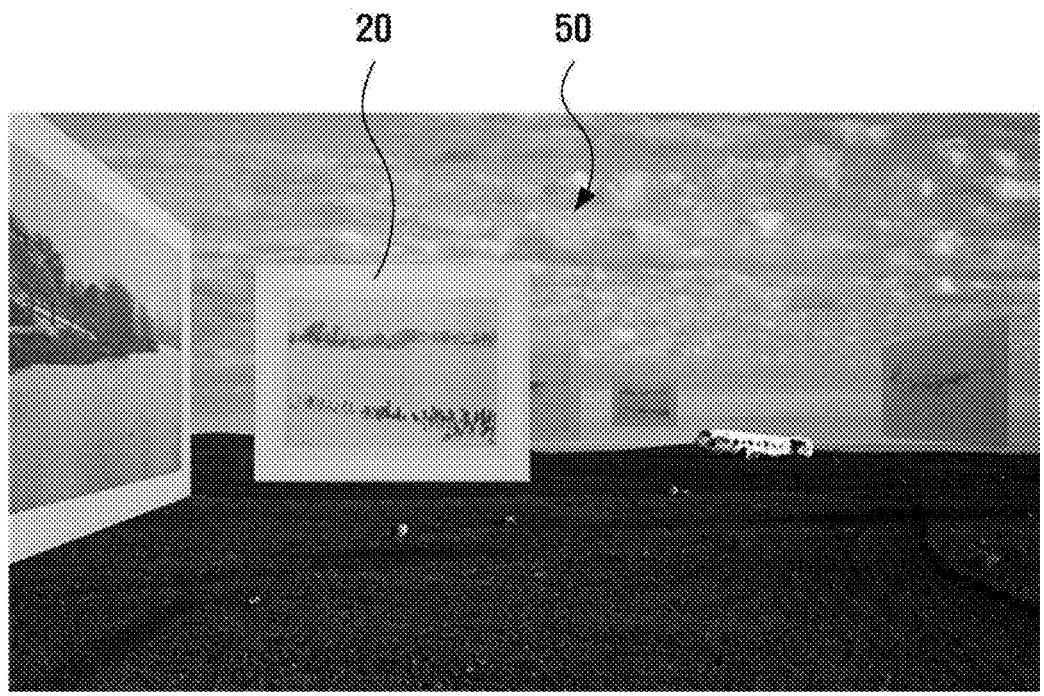

FIGS. 7 and 8 are views schematically illustrating a virtual exhibition space image.

FIG. 7 illustrates a virtual exhibition space image generated using the perspective view, the virtual exhibition space includes four wall surfaces 10, and at least one content image 20 is provided on the wall surface. In particular, it may be recognized that the content image placed on the leftmost wall surface is modified based on the shape of the wall surface in the perspective view.

Referring to FIG. 8, the virtual exhibition space image may include a portion a place 50 associated with the content image 20, for example, may include a portion of a place where the corresponding picture was taken when the content is a picture. The virtual exhibition space may include a plurality of wall surfaces connected with or separated from a place in which the relevant photograph is taken.

Figure 9:
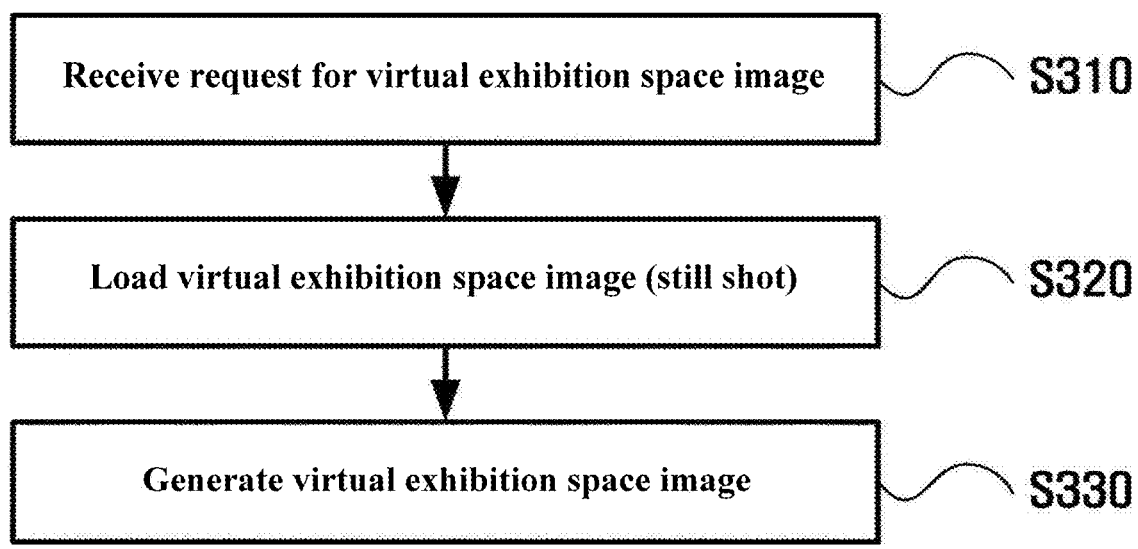
FIG. 9 is a block diagram schematically illustrating the configuration of a method for providing a virtual exhibition space utilizing a 2.5 D image, according to an embodiment of the inventive concept.

FIG. 9 is a flowchart schematically illustrating the configuration of a method for providing a virtual exhibition space utilizing a 2.5 D image, according to an embodiment of the inventive concept; and The duplicated description of the system for providing a virtual exhibition space by utilizing the 2.5D image according to an embodiment of the inventive concept, which is made with reference to FIGS. 1 to 8, will be omitted.

Referring to FIG. 9, the method for providing the virtual exhibition space utilizing the 2.5 dimension image according to an embodiment of the inventive concept includes receiving a request for the virtual exhibition space image from a user, by the user terminal 200 (S310), loading a still shot of a virtual exhibition space image received from a server 100, by the user terminal 200 (S320), and generating the virtual exhibition space image to provide the virtual exhibition space image to the user, by the user terminal 200 (S330).

Although not clearly illustrated, as described above, the generating of the virtual exhibition space image to provide the virtual exhibtion space image, by the user terminal 200 may further include receiving the content image from the server 100 during the loading of the still shot of the virtual exhibition space image; and replacing the still shot of the virtual exhibition space image with the completed virtual exhibition space image and providing the completed virtual exhibition space image.

Figure 10:
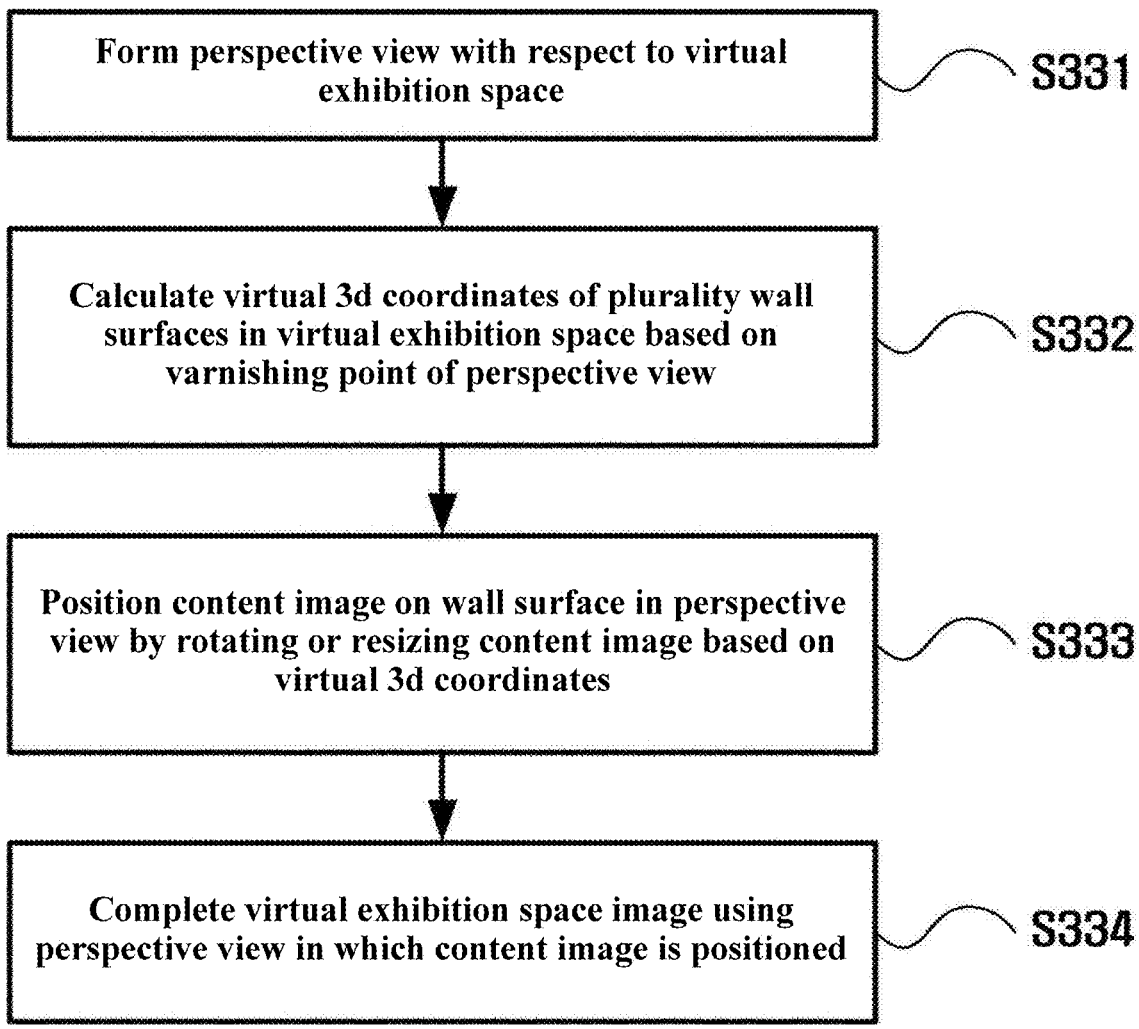
FIG. 10 is a flowchart schematically illustrating the detailed configuration of a step of generating a virtual exhibition space of FIG. 9.

FIG. 10 is a flowchart schematically illustrating the detailed configuration of the step of generating the virtual exhibition space image of FIG. 9.

Referring to FIG. 10, the generating of the virtual exhibition space image (S330) includes forming a perspective view having a specific viewpoint and the specific number of vanishing points, with respect to a specific virtual exhibition space having a plurality of wall surfaces (S331), calculating virtual 3D coordinates for a specific position on the plurality of wall surfaces in the perspective view, based on the varnishing points of the perspective view (S332), positioning the specific 2D content image on at least one wall surface of the plurality of wall surfaces in the perspective view by rotating or resizing a specific 2D content image based on the virtual 3D coordinates (S333), and completing the virtual exhibition space image by using the perspective view in which the content image is positioned (S334).

Although not clearly illustrated, as described above, the method for providing the virtual exhibition space utilizing the 2.5D image according to an embodiment of the inventive concept may further include obtaining information on a viewpoint change of the user by the user terminal 200; and regenerating the virtual exhibition space image based on the information on the viewpoint change by the user terminal 200. In addition, the regenerating of the virtual exhibition space image based on the information on the viewpoint change includes reforming a perspective view based on a viewpoint which is changed for the virtual exhibition space.

Although not clearly illustrated, as described above, the generating of the virtual exhibition space image may include completing the virtual exhibition space image by further using a plurality of shadow layers having mutually, different transparencies and the specific number of lighting layers, determining a range of a shadow value based on an intensity of light and a position of the light at the lighting layer, and determining the number of the shadow layers or a layout of the shadow layers, based on the range of the shadow value.

The method or the steps of the algorithm described according to an embodiment of the inventive concept may be directly implemented in hardware or implemented by a computer program executed by the hardware, or implemented by the combination thereof. A computer program may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer readable recording medium well known in the art to which the inventive concept pertains.

According to the inventive concept described above, the 3D virtual exhibition space service having the 3D effect may be provided using the 2.5D image based on the cognitive illusion, which is different from the conventional 2D gallery service.

In addition, according to the inventive concept as described above, since the 3D physical engine is not used to provide the 3D virtual exhibition space service, the 3D virtual exhibition space may be rapidly formed, and the damage to the content may be minimized.

Alternatively, according to the inventive concept as described above, since a still image is first used to provide the 3D virtual exhibition space, the data may be effectively transmitted and the use of data may be reduced.

In addition, according to the inventive concept as described above, since multiple shadow layers and lighting layers are used, the 3D virtual exhibition space may be formed in more detail and actually.

The effects of the inventive concept are not limited to the above, but other effects, which are not mentioned, will be apparently understood to those skilled in the art.

Although embodiments of the inventive concept have been described with reference to accompanying drawings, those skilled in the art should understand that various modifications are possible without departing from the technical scope of the inventive concept or without changing the subject matter of the inventive concept Therefore, those skilled in the art should understand that the technical embodiments are provided for the illustrative purpose in all aspects and the inventive concept is not limited thereto.

What is claimed is:

1. A system for providing a virtual exhibition space by utilizing a 2.5 dimension image, the system comprising:
    a virtual exhibition space generator configured to generate a virtual exhibition space image; and
    a server configured to receive a request for the virtual exhibition space image from a user terminal and to provide the virtual exhibition space image to the user terminal,
    wherein the virtual exhibition space generator:
        forms a perspective view having a specific viewpoint and the specific number of vanishing points with respect to a specific virtual exhibition space having a plurality of wall surfaces;
        calculates virtual three dimensional (3D) coordinates for a specific position on the plurality of wall surfaces in the perspective view, based on the varnishing points of the perspective view;
        positions a specific two dimensional (2D) content image on at least one wall surface of the plurality of wall surfaces in the perspective view by rotating or resizing the specific 2D content image based on the virtual 3D coordinates; and
        completes a virtual exhibition space image by using the perspective view having the content image.

2. The system of claim 1, wherein the communication device receives information on a viewpoint change of a user from the user terminal,
    wherein the virtual exhibition space generator regenerates a virtual exhibition space image based on the information on the viewpoint change, and
    wherein the regenerating of the virtual exhibition space image based on the information on the viewpoint change includes reforming a perspective view formed based on a viewpoint which is changed for the virtual exhibition space.

3. The system of claim 1, wherein the virtual exhibition space generator:
    completes the virtual exhibition space image by further using a plurality of shadow layers having mutually different transparencies and the specific number of lighting layers;
    determines a range of a shadow value based on an intensity of light and a position of the light at the lighting layer; and
    determines the number of the shadow layers or a layout of the shadow layers, based on the range of the shadow value.

4. A method for providing a virtual exhibition space utilizing a 2.5 dimension image, the method, which is implemented by a computer, comprising:
    receiving a request for a virtual exhibition space image from a server; and
    generating and providing the virtual exhibition space image,
    wherein the generating and providing of the virtual exhibition space image includes:
    forming a perspective view having a specific viewpoint and the specific number of vanishing points with respect to a specific virtual exhibition space having a plurality of wall surfaces;
    calculating virtual 3D coordinates for a specific position on the plurality of wall surfaces in the perspective view, based on the varnishing points of the perspective view;
    positioning the specific 2D content image on at least one wall surface of the plurality of wall surfaces in the perspective view by rotating or resizing a specific 2D content image based on the virtual 3D coordinates; and
    completing a virtual exhibition space image by using the perspective view having the content image.

5. The method of claim 4, further comprising:
    loading a still shot of the virtual exhibition space image received from the server,
    wherein the generating and providing of the virtual exhibition space image further includes:

receiving the content image from the server during the loading of the still shot of the virtual exhibition space image; and replacing the still shot of the virtual exhibition space image with the completed virtual exhibition space image and providing the completed virtual exhibition space image.

6. The method of claim 4, further comprising:

obtaining information on a viewpoint change of a user; and regenerating a virtual exhibition space image based on the information on the viewpoint change, wherein the regenerating of the virtual exhibition space image based on the information on the viewpoint change includes:

reforming a perspective view based on a viewpoint which is changed for the virtual exhibition space.

7. The method of claim 4, wherein the generating of the virtual exhibition space image includes:

completing the virtual exhibition space image by further using a plurality of shadow layers having mutually different transparencies and the specific number of lighting layers;

determining a range of a shadow value based on an intensity of light and a position of the light at the lighting layer; and determining the number of the shadow layers or a layout of the shadow layers, based on the range of the shadow value.

8. A computer-readable recording medium having a computer program to execute the method for providing the virtual exhibition space utilizing the 2.5D image of claim 4.

9. A computer program stored on a computer-readable recording medium and linked with a computer to execute the method for providing the virtual exhibition space by utilizing the 2.5D image of claim 4.

* * * * *